(12) United States Patent
Harris

(10) Patent No.: US 9,277,745 B2
(45) Date of Patent: Mar. 8, 2016

(54) ELEVATED DRIVE-IN HUNTING BLIND

(71) Applicant: Stephen R. Harris, Raymond, MS (US)

(72) Inventor: Stephen R. Harris, Raymond, MS (US)

( * ) Notice: Subject to any disclaimer, the term of this patent is extended or adjusted under 35 U.S.C. 154(b) by 0 days.

(21) Appl. No.: 14/247,433

(22) Filed: Apr. 8, 2014

(65) Prior Publication Data

US 2015/0282475 A1  Oct. 8, 2015

(51) Int. Cl.
| | |
|---|---|
| *E04H 1/02* | (2006.01) |
| *A01M 31/02* | (2006.01) |
| *E04H 1/12* | (2006.01) |
| *E04H 6/02* | (2006.01) |
| *E06C 9/02* | (2006.01) |
| *E04H 15/00* | (2006.01) |

(52) U.S. Cl.
CPC .............. *A01M 31/025* (2013.01); *A01M 31/02* (2013.01); *E04H 1/02* (2013.01); *E04H 1/1205* (2013.01); *E04H 6/02* (2013.01); *E04H 15/001* (2013.01); *E06C 9/02* (2013.01)

(58) Field of Classification Search
CPC ....... E04H 15/001; E04H 15/04; E04H 15/44; E04H 15/48; A01M 31/025; Y10S 135/901
USPC .................. 52/79.1, 79.5, 173.1; 135/901
See application file for complete search history.

(56) References Cited

U.S. PATENT DOCUMENTS

| | | | |
|---|---|---|---|
| 3,018,857 A | | 1/1962 | Parham |
| 4,456,272 A | | 6/1984 | Kroeger |
| 4,483,090 A | | 11/1984 | Carper |
| 4,696,374 A | | 9/1987 | Hale |
| 4,787,477 A | | 11/1988 | Dolan |
| 4,854,094 A | * | 8/1989 | Clark ............... 52/79.1 |
| 4,854,631 A | * | 8/1989 | Laursen ............ 296/158 |
| 5,070,661 A | * | 12/1991 | Lo Guidici ........ 52/79.1 |
| 5,285,604 A | * | 2/1994 | Carlin .............. 52/79.1 |
| 5,297,844 A | | 3/1994 | Haustein |
| 5,592,960 A | | 1/1997 | Williams |
| 5,936,550 A | * | 8/1999 | McCauley ........ B60P 3/14 340/936 |
| 6,267,429 B1 | * | 7/2001 | Kuzmich ........ B60P 1/435 296/50 |
| 6,565,139 B2 | | 5/2003 | Bayerle et al. |
| 6,769,379 B2 | | 8/2004 | Foiles |
| 7,063,035 B2 | | 6/2006 | Belcher |
| 7,188,635 B2 | * | 3/2007 | Johnson ........... 135/87 |
| 2004/0195042 A1 | | 10/2004 | Smith |
| 2004/0216395 A1 | * | 11/2004 | Wentworth, Jr. ...... B60P 3/34 52/79.5 |
| 2007/0074933 A1 | * | 4/2007 | Kerns ............. 182/127 |
| 2009/0236179 A1 | * | 9/2009 | Lopez ............ 182/63.1 |
| 2010/0133873 A1 | * | 6/2010 | Carlton .......... 296/168 |
| 2012/0023837 A1 | * | 2/2012 | Eisenbeisz ....... 52/79.5 |
| 2013/0087178 A1 | | 4/2013 | Atherton |
| 2013/0118540 A1 | | 5/2013 | Hayes |

* cited by examiner

*Primary Examiner* — Brian Glessner
*Assistant Examiner* — Paola Agudelo
(74) *Attorney, Agent, or Firm* — Dale J. Ream

(57) ABSTRACT

An elevated drive-in hunting blind for use by a hunter while seated on an all-terrain vehicle ("ATV") includes a primary enclosure having a floor, a roof, and opposed side walls, the primary enclosure having a end wall extending between distal edges of the side walls and defining an open end opposite the end wall. A door is pivotally coupled to a proximal edge of a respective side wall and selectively movable between an open and closed configurations allowing or preventing the ATV to enter the primary enclosure, respectively. A shooting window adjacent the roof is defined by one of the door, end wall, or side walls. The primary enclosure is mounted atop and supported by a framework having a plurality of legs. A ramp extends at an angle between the floor adjacent the open end and the ground, the ramp facilitating entry or exit of the ATV.

11 Claims, 8 Drawing Sheets

ELEVATED DRIVE-IN HUNTING BLIND

BACKGROUND OF THE INVENTION

This invention relates generally to hunting blinds and, more particularly, to a hunting blind that is elevated above a ground surface and configured with a ramp to selectively receive an all-terrain vehicle ("ATV") therein and so that a hunter may shoot at game while sitting on the ATV inside the blind.

A hunting blind is a structure that enables a hunter to remain undetected by game being hunted, whether the game is an animal such as deer or birds such as ducks. A hunting blind also provides a limited amount of shelter from weather elements such as rain, snow, or bitterly cold wind. Some hunting blinds are elevated on a support framework or lodged in a tree so as to increase the hunter's ability to clearly see the hunted game from a distance and elevated vantage point.

Hunting blinds are often situated back in a wilderness environment a significant distance from a road. In such an instance, a hunter is faced with having to walk a distance from the nearest road to the hunting blind while carrying hunting supplies. However, the hunter may choose to ride an all-terrain vehicle ("ATV") into the woods which alleviates some of the burden of a long walk and hauling hunting gear. However, the hunter is then faced with the disadvantage of leaving the ATV exposed which may cause detection by the game to be hunted or simply leave the ATV exposed to weather elements for an extended period of time.

Therefore, it would be desirable to have an elevated drive-in hunting blind having a ramp and configured to receive an ATV therein. Further, it would be desirable to have an elevated drive-in hunting blind that makes an ATV undetectable by game being hunted and that shelters the ATV from weather elements. In addition, it would be desirable to have an elevated drive-in hunting blind that selectively includes a primary enclosure configured to receive the ATV and an auxiliary enclosure mounted atop the primary enclosure that enables a hunter to view game from a higher elevation.

SUMMARY OF THE INVENTION

An elevated drive-in hunting blind for use by a hunter on an all-terrain vehicle ("ATV") according to the present invention includes a primary enclosure having a floor, a roof, and a pair of opposed side walls extending upwardly from the floor, the primary enclosure having an end wall extending upwardly from the floor and extending between distal edges of the side walls. The primary enclosure defines an open end opposite the end wall. A door is pivotally coupled to a proximal edge of a respective side wall and selectively movable between an open configuration allowing the ATV to enter the primary enclosure and a closed configuration preventing the ATV from entering the primary enclosure. A shooting window is defined by one of the door, the end wall, or the side walls that enables a hunter to shoot a gun while seated on the ATV inside the hunting blind.

The primary enclosure is mounted atop and supported by a framework having a plurality of legs. A ramp extends at an angle between the floor adjacent the open end and the ground surface, the ramp being configured to support the ATV when entering or exiting the primary enclosure.

Therefore, a general object of this invention is to provide an elevated drive-in hunting blind having a ramp and an interior area configured to receive an ATV therein.

Another object of this invention is to provide a hunting blind, as aforesaid, that enables a hunter to view game from an elevated position and which enables the hunter to operate his firearm while still seated on an ATV.

Still another object of this invention is to provide a hunting blind, as aforesaid, that enables a hunter to drive an ATV to a hunting location and to shield the ATV from weather elements while hunting.

Yet another object of this invention is to provide a hunting blind, as aforesaid, that is easy to use before, during, and after hunting.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
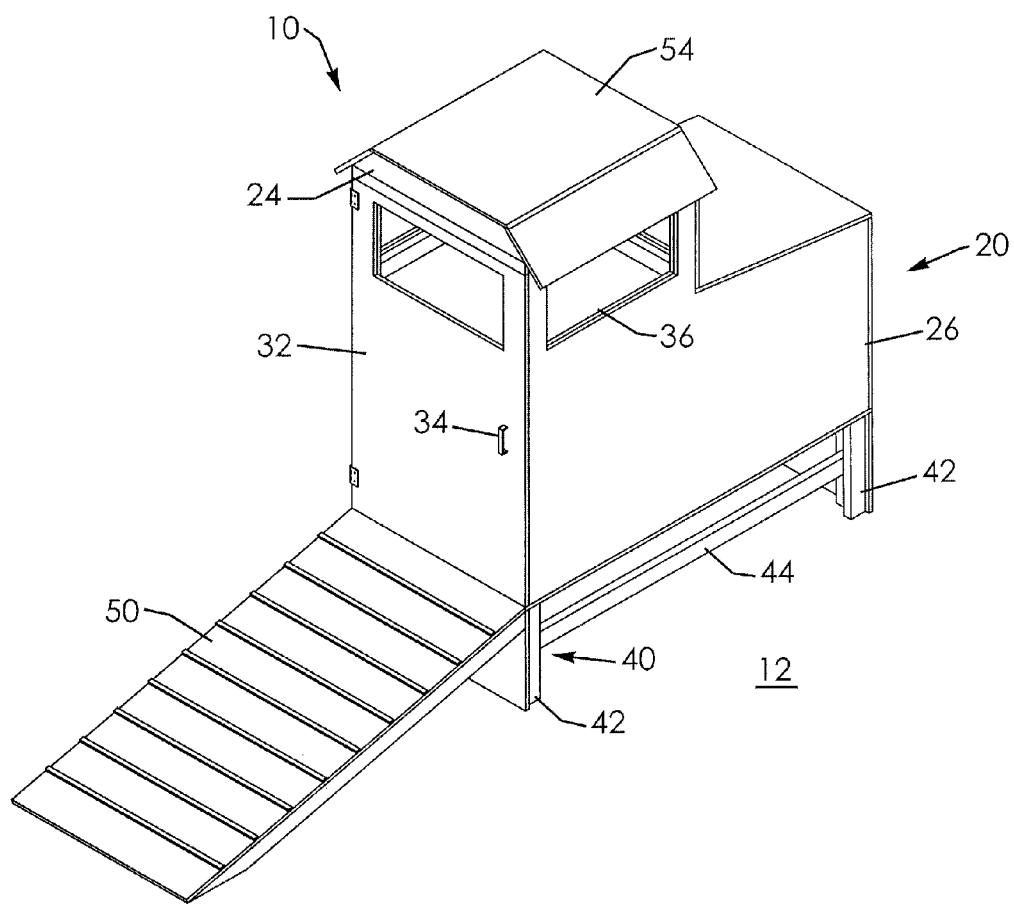
FIG. 1 is a perspective view of a drive-in elevated hunting blind according to one embodiment of the present invention illustrated with a door in a closed configuration.
Figure 2:
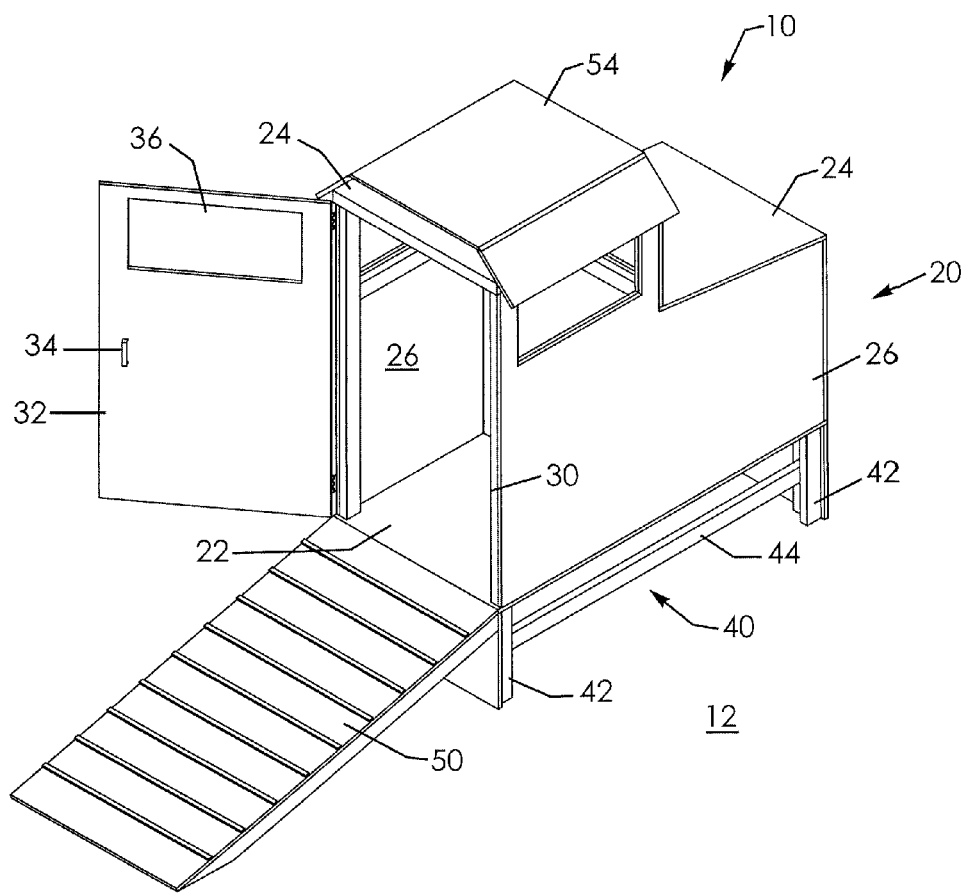
FIG. 2 is another perspective view of the hunting blind as in FIG. 1 with the door in an open configuration.
Figure 3:
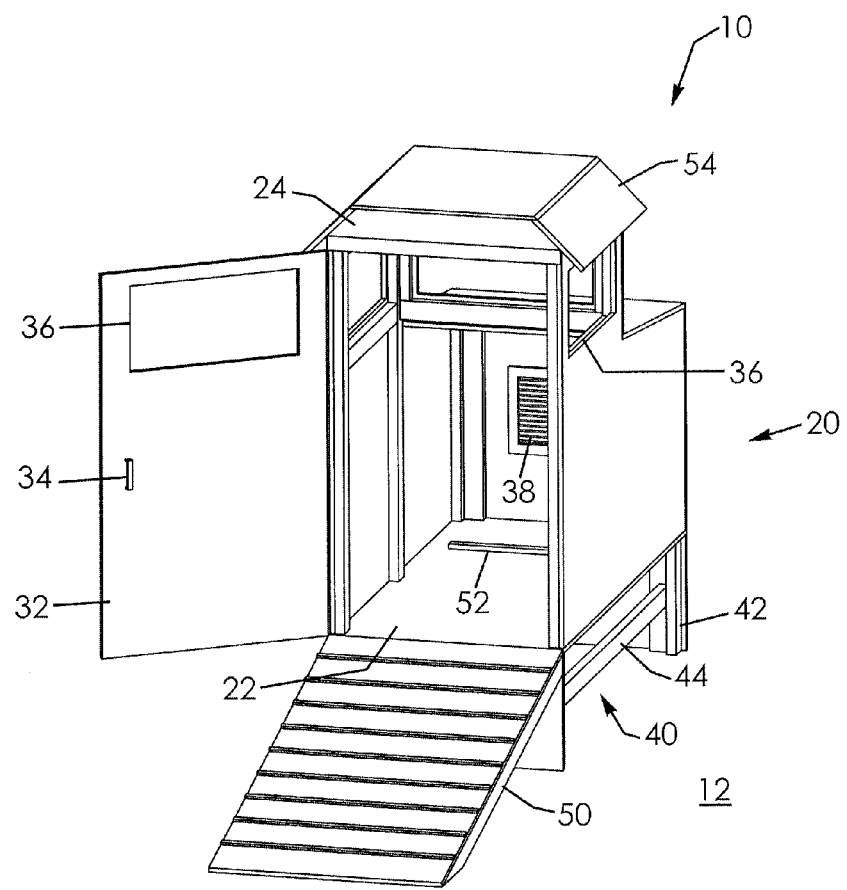
FIG. 3 is an end view of the hunting blind as in FIG. 2.

A drive-in elevated hunting blind according to a preferred embodiment of the present invention will now be described with reference to FIGS. 1 to 8 of the accompanying drawings. The hunting blind 10 includes a primary enclosure 20 elevated by a framework 40 above a ground surface 12 and configured to receive an all-terrain vehicle ("ATV") therein. Access to an interior of the primary enclosure 20 is regulated by a door 32 and with a ramp 50.

The primary enclosure 20 includes a floor 22 having a generally rectangular and planar configuration and is situated generally parallel to a ground surface as will become clear below. The floor 22 includes peripheral side and end edges. The primary enclosure 20 also includes at least three upstanding walls. Namely, a pair of oppositely disposed side walls 26 extends upwardly from respective peripheral edges of the floor 22. An end wall 28 extends upwardly from a distal edge of the floor 22 and extends between respective distal edges of the side walls 26. It is understood that the floor 22 defines a length and width that is sufficient to accommodate an ATV as will be described further later.

The primary enclosure 20 includes a roof 24 situated atop respective upper edges of respective walls. It is understood the roof 24 may include more than one level depending on the relative height of respective side walls 26. In any case, the floor 22, side walls 26, and end wall 28 define an interior area. The walls also define an open end 30 opposite the end wall 28. A door 32 may be pivotally coupled to a proximal edge of one of the side walls 26 and pivotally movable between an open configuration (FIG. 2) that provides access to the interior of the primary enclosure 20 through the open end 30 and a closed configuration (FIG. 1) that prevents access to the interior of the primary enclosure 20 through the open end 30. The door 32 may include a handle 34 with which a user may urge the door 32 between open and closed configurations.

A shooting window 36 is defined by at least one of the door 32 or side walls 26, the shooting window 36 being configured to enable a hunter to extend, aim, and fire a gun. The walls and door may define multiple shooting windows. Preferably, the shooting window 36 is positioned adjacent the roof 24 so that a hunter who remains seated on an ATV within the interior area of the primary enclosure 20 can take a shot without dismounting the ATV. In addition, one of the side or end walls includes an air vent 38 configured to facilitate movement of ambient air into or out of the interior area of the primary enclosure 20.

Figure 4:
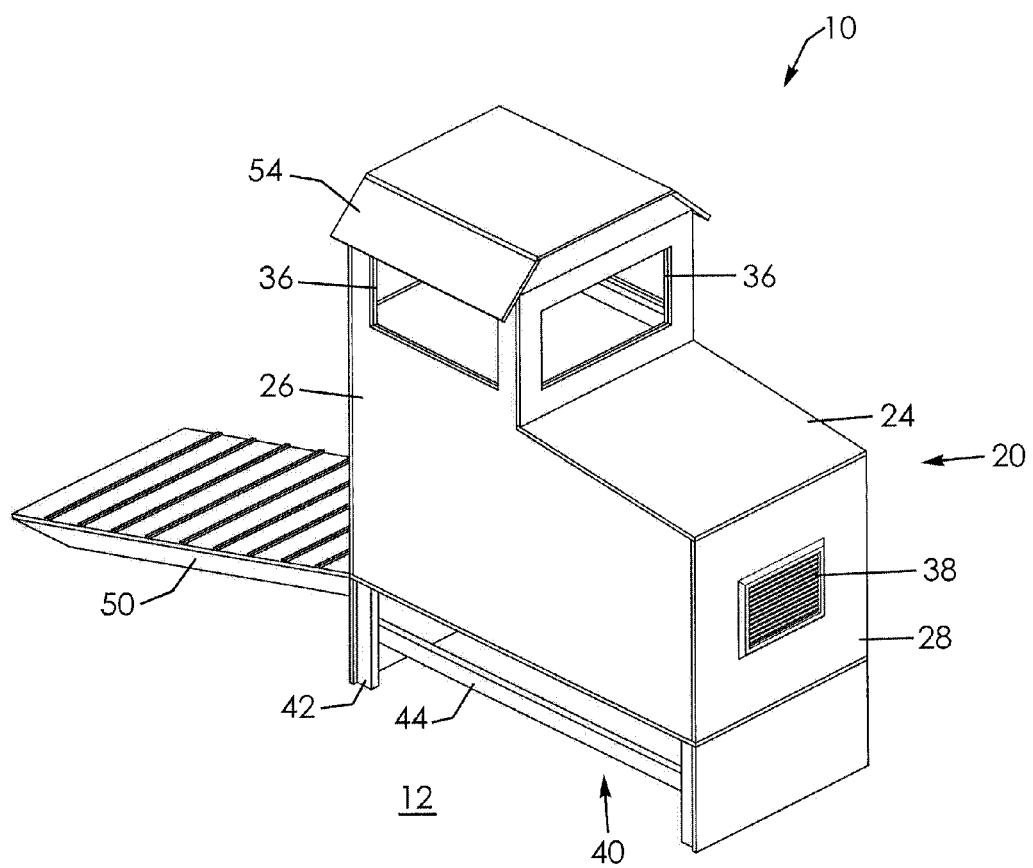
FIG. 4 is a perspective view of the hunting blind as in FIG. 2 from a rearward angle.
Figure 5:
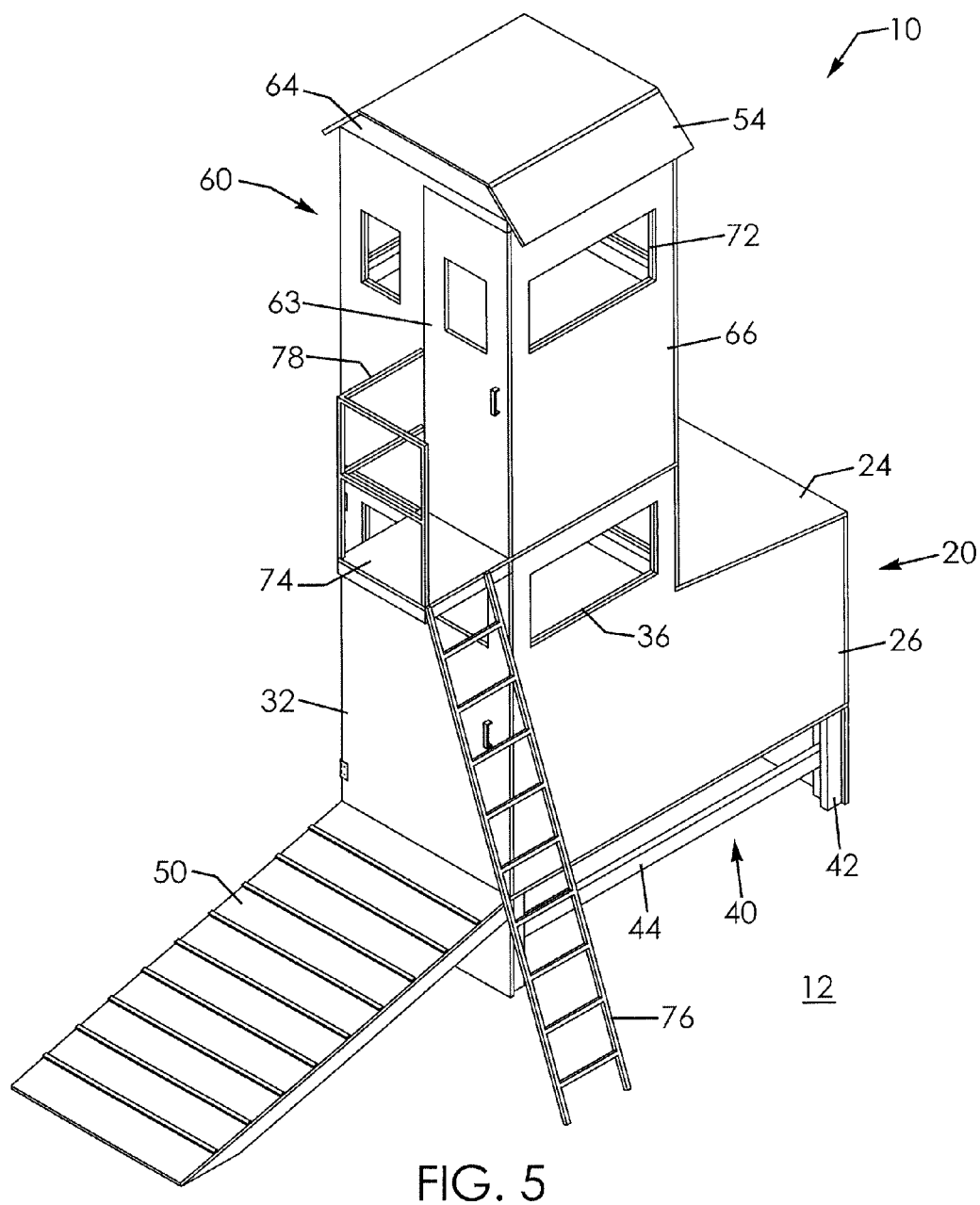
FIG. 5 a perspective view of a drive-in elevated hunting blind according to another embodiment of the present invention illustrated with primary and auxiliary doors in a closed configuration.
Figure 6:
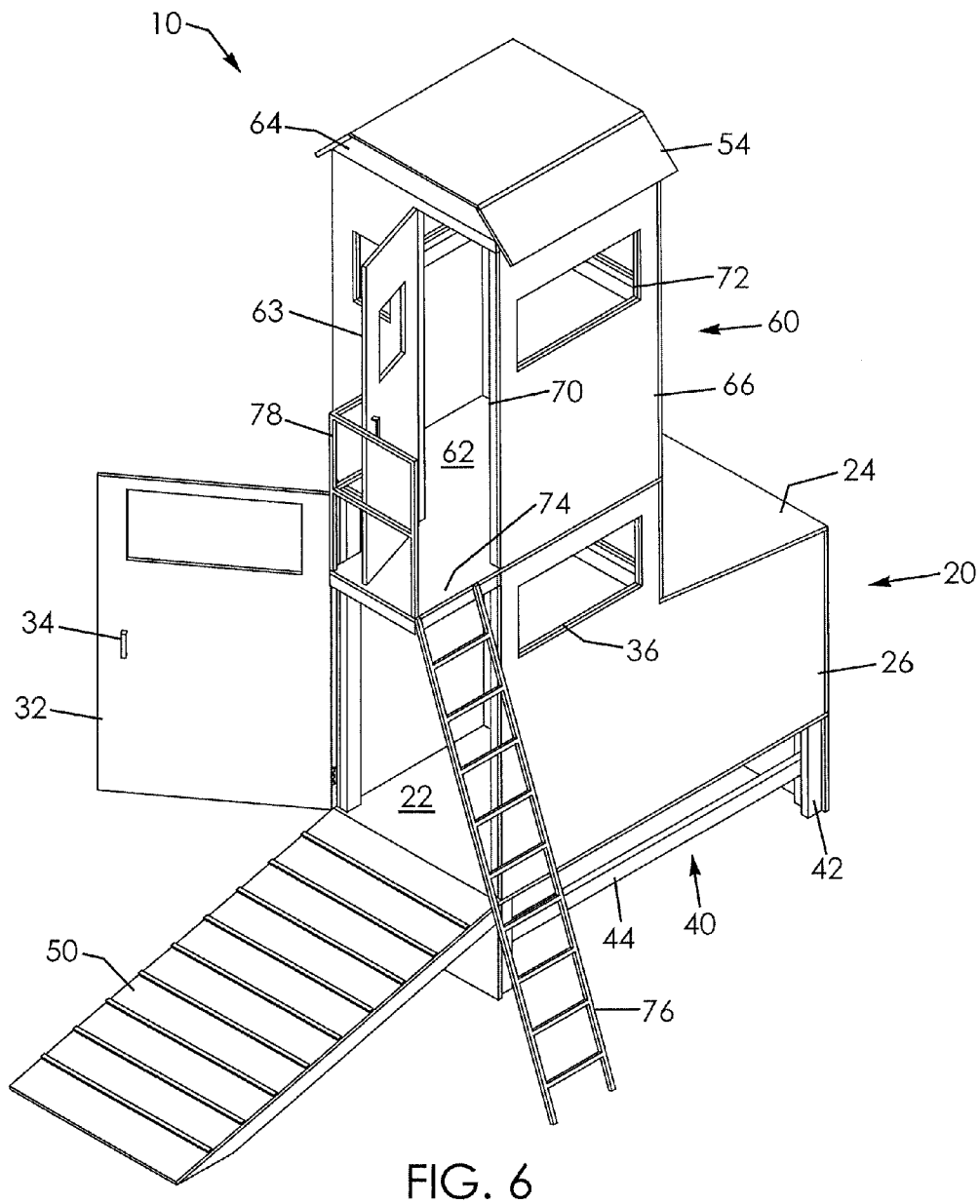
FIG. 6 is another perspective view of the hunting blind as in FIG. 5 with the primary and secondary doors in an open configuration.
Figure 7:
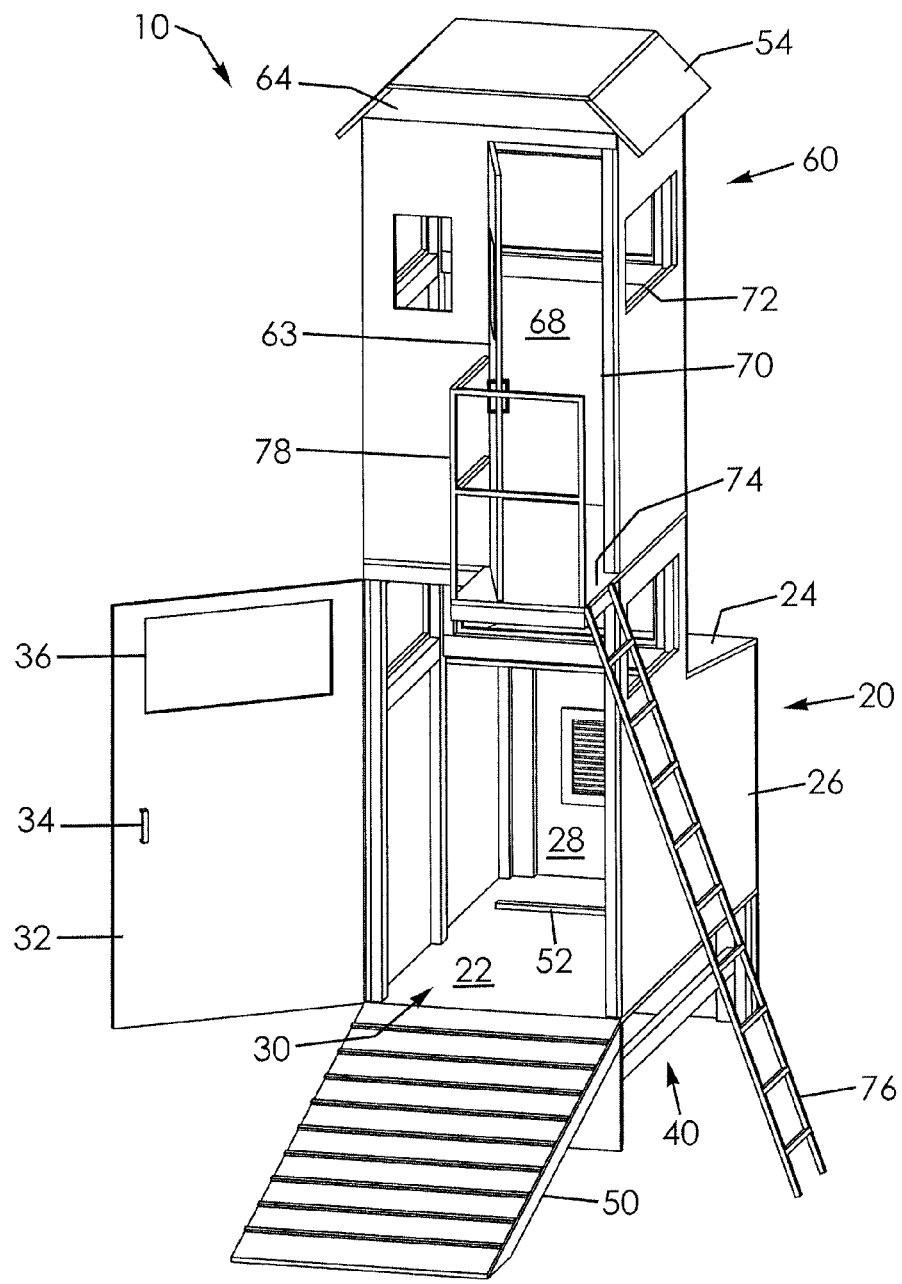
FIG. 7 is an end view of the hunting blind as in FIG. 6.
Figure 8:
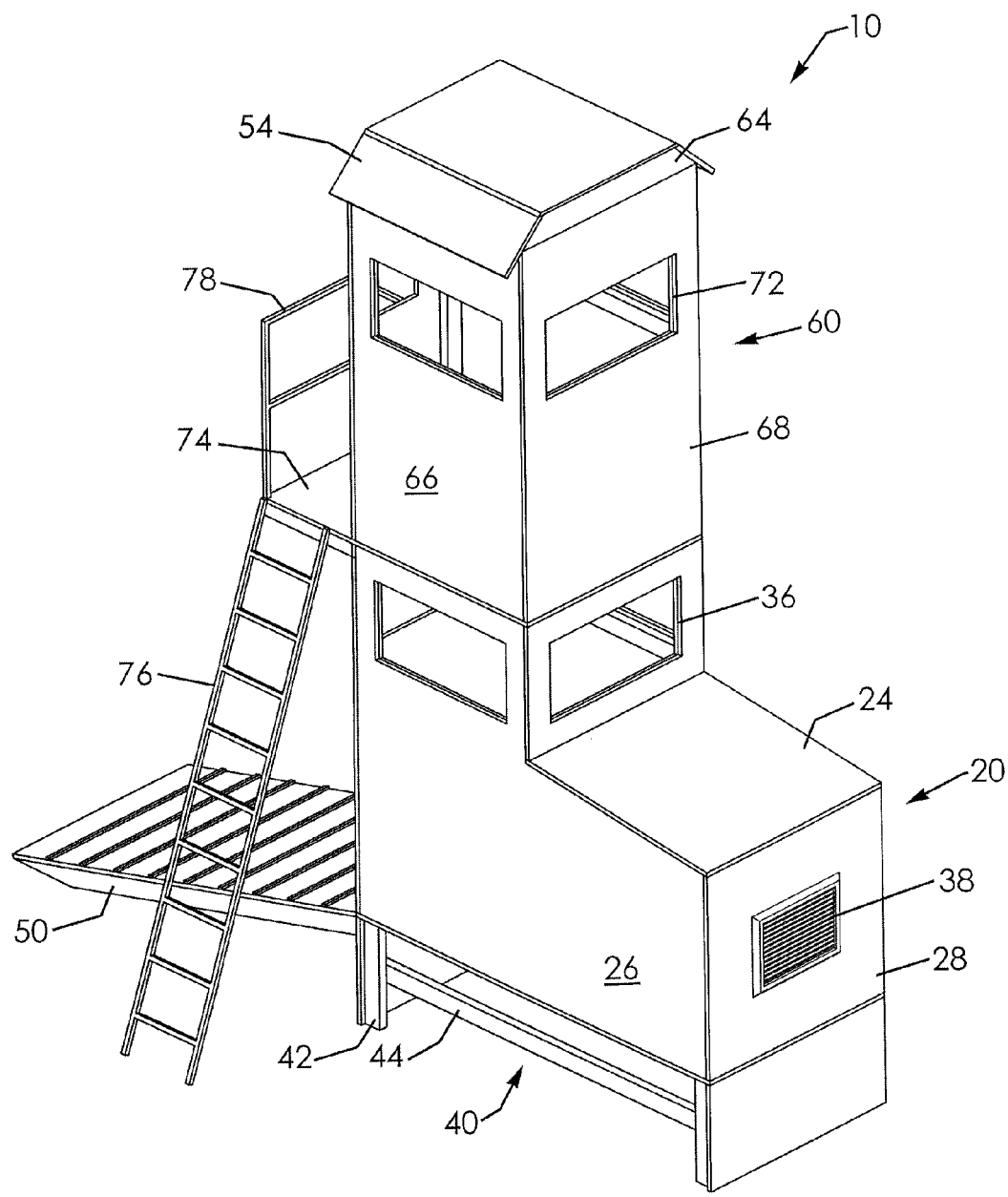
FIG. 8 is a perspective view of the hunting blind as in FIG. 6 from a rearward angle.

The drive-in hunting blind 10 includes a framework 40 having a robust construction suitable to support the primary enclosure 20. More particularly, the framework 40 may include a plurality of spaced apart leg members 42 coupled to a lower surface of the floor 22 of the primary enclosure 20. In other words, the primary enclosure 20 is mounted atop the framework 40 and supported thereby. In addition, the framework 40 may include a plurality of struts 44 extending between respective leg members 42 and configured to enhance the strength and stability of the framework 40 (FIGS. 1 and 4). It is understood that the framework 40 supports and positions the primary enclosure 20 at a predetermined elevation about the ground surface 12 so as to give a hunter the advantage of clearly identifying and shooting the game he is hunting. In one embodiment, each leg member 42 may be independently length adjustable so that the primary enclosure 20 may be leveled when the ground itself is not level.

The hunting blind 10 includes a ramp 50 that extends at an angle between a ground surface and the floor 22 of the primary enclosure 20. Preferably, the ramp 50 includes a width that is substantially the same as the width of the floor 22 so that an ATV may be driven seamlessly from the ramp 50 onto the floor 22 and into the primary enclosure 20 (when the door 32 is in the open configuration). The ramp 50 includes a construction sufficiently robust as to support an ATV as it drives into or exits from the primary enclosure 20.

In one embodiment, a wheel stop 52 may be situated on the floor 22 of the primary enclosure 20 and is configured to extend substantially between the pair of side walls 26. The wheel stop 52 has a generally linear configuration and a low profile of heavy construction so as to resist movement of a wheel of an ATV being driven into the primary enclosure. The wheel stop 52 may be positioned at a predetermined location so as to signal to the rider of an ATV that the ATV is properly positioned within the primary enclosure 20.

A rain shield 54 may be mounted atop the roof 24 of the primary enclosure 20. The rain shield 54 is configured to direct rain away from the shooting window 36. In one embodiment, the rain shield 54 may be removable from the roof 24, such as to be used with an auxiliary enclosure 60 as will be described below.

In one embodiment, the hunting blind 10 may include an auxiliary enclosure 60 (FIG. 5) having a construction substantially similar to that of the primary enclosure 20 except as specifically described below. The auxiliary enclosure 60 may be mounted atop the primary enclosure 20. The auxiliary enclosure 60 includes an auxiliary floor 62, auxiliary roof 64, and oppositely disposed auxiliary side walls 66 extending therebetween. An auxiliary end wall 68 extends upwardly from the auxiliary floor 62 and between distal edges of the auxiliary side walls 66.

The auxiliary enclosure 60 defines an open end 70 opposite the closed auxiliary end wall 68 or, in one embodiment, includes another end wall defining a partial opening. An auxiliary door 63 is pivotally coupled to a respective side wall or to the another end wall and is movable between open and closed configurations to provide or prevent access to the auxiliary enclosure 60, respectively. The auxiliary side walls 66, auxiliary end wall 68, or auxiliary door 63 define an auxiliary shooting window 72.

The auxiliary floor 62 includes a ledge 74 extending outwardly from the open end of the auxiliary enclosure 60. A ladder 76 extends between the ledge 74 and a ground surface. In one embodiment, the ladder 76 is separate and uncoupled to the ledge 74, whereas it may be coupled to the ledge 74 in another embodiment. In addition, a safety railing 78 may be positioned around a perimeter of the ledge 74.

In use, a hunter desiring to hunt while remaining seated on his all-terrain vehicle ("ATV") may drive to the location of the drive-in elevated hunting blind. Once the door 32 is opened, the ATV may be driven up the ramp 50 and into the open interior area of the primary enclosure 20. If desired, the door 32 may be closed and the motor disengaged. The hunter is then able to shoot a gun or bow through the shooting window 36—all the while remaining seated on the ATV. Optionally, the hunter may selectively install the auxiliary enclosure 60 atop the primary enclosure 20 as described above. Thereafter, the hunter may climb up to the ledge 74 and enter the primary enclosure 20 so as to shoot game through the auxiliary shooting window 72.

It is understood that while certain forms of this invention have been illustrated and described, it is not limited thereto except insofar as such limitations are included in the following claims and allowable functional equivalents thereof.

The invention claimed is:

1. An elevated drive-in hunting blind for use by a hunter on an all-terrain vehicle ("ATV"), comprising:
   a primary enclosure having a floor, a roof opposite said floor, and a pair of opposed side walls extending upwardly from said floor, said primary enclosure having a end wall extending upwardly from said floor and extending between distal edges of said side walls;
   wherein said primary enclosure defines an open end opposite said end wall, said open end defining an open end opening spanning completely between said side walls so as to selectively enable the ATV to pass therethrough;
   a door pivotally coupled to a proximal edge of a respective side wall and selectively movable between an open configuration allowing access into said primary enclosure via said open end opening and a closed configuration preventing access into said primary enclosure;
   wherein at least one of said door, said end wall, or said side walls defines a shooting window;
   a framework having a plurality of spaced apart leg members supporting said primary enclosure at an elevated position above a ground surface; and
   a ramp having an upper end spanning completely said open end opening between respective side walls and extending at an angle between said floor adjacent said open end and the ground surface, said ramp being configured to support the ATV when entering or exiting the primary enclosure;
   a wheel stop having a low profile positioned on said floor of said primary enclosure and extending between said side walls, said wheel stop having a linear configuration and a heavy construction being configured to resist movement of a wheel of the ATV.

2. The hunting blind as in claim 1, wherein said floor defines a width and a length sufficient to receive the ATV thereon, said pair of side walls and said end wall extending upwardly from peripheral edges of said floor.

3. The hunting blind as in claim 1, wherein said at least one shooting window is adjacent said roof of said primary enclosure and configured such that the hunter can shoot a firearm through said shooting window while seated on the ATV.

4. The hunting blind as in claim 1, comprising an air vent situated on one of said pair of side walls or said end wall, said air vent being configured to enhance ambient air flow in and out of said primary enclosure.

5. The hunting blind as in claim 1, wherein each leg member is length adjustable for leveling said primary structure on the ground surface.

6. The hunting blind as in claim 1, comprising a plurality of struts extending between said plurality of legs of said framework, respectively, and configured to enhance said framework's support of said primary enclosure.

7. The hunting blind as in claim 1, comprising a rain shield mounted atop said roof, said rain shield configured to direct water away from said at least one shooting window.

8. The hunting blind as in claim 1, comprising:
an auxiliary enclosure mounted atop said roof of said primary enclosure, said auxiliary enclosure having an auxiliary floor, an auxiliary roof opposite said auxiliary floor, and a pair of opposed auxiliary side walls extending upwardly from said auxiliary floor, said auxiliary enclosure having an auxiliary end wall extending upwardly from said auxiliary floor and extending between distal edges of said auxiliary side walls; and
wherein said auxiliary enclosure defines an open end opposite said auxiliary end wall.

9. The hunting blind as in claim 8, comprising:
an auxiliary door pivotally coupled to a proximal edge of a respective side wall of said auxiliary enclosure and selectively movable between an open configuration allowing access to said auxiliary enclosure through said open end and a closed configuration preventing access to said auxiliary enclosure through said open end; and
wherein at least one of said auxiliary door, said auxiliary end wall, or said auxiliary side walls defines an auxiliary shooting window.

10. The hunting blind as in claim 9, wherein said auxiliary floor includes a ledge extending outwardly from said open end of said auxiliary enclosure.

11. The hunting blind as in claim 10, comprising a ladder extending between said ledge and the ground surface so as to provide selective access to said auxiliary enclosure.

* * * * *